(12) United States Patent
Lambert

(10) Patent No.: US 9,179,647 B2
(45) Date of Patent: Nov. 10, 2015

(54) ANIMAL COLLAR

(71) Applicant: Brian A. Lambert, East Wenatchee, WA (US)

(72) Inventor: Brian A. Lambert, East Wenatchee, WA (US)

(*) Notice: Subject to any disclaimer, the term of this patent is extended or adjusted under 35 U.S.C. 154(b) by 0 days.

(21) Appl. No.: 13/774,927

(22) Filed: Feb. 22, 2013

(65) Prior Publication Data

US 2013/0213320 A1    Aug. 22, 2013

Related U.S. Application Data

(60) Provisional application No. 61/601,803, filed on Feb. 22, 2012.

(51) Int. Cl.
*A01K 27/00* (2006.01)

(52) U.S. Cl.
CPC .................. *A01K 27/001* (2013.01)

(58) Field of Classification Search
CPC ............... A01K 27/00; A01K 27/001–27/003; A01K 27/005
USPC ................... 119/769–72, 774, 776, 792, 793, 119/856–58, 863, 865
IPC ........................................................ A01K 27/00
See application file for complete search history.

(56) References Cited

U.S. PATENT DOCUMENTS

| | | | |
|---|---|---|---|
| 649,026 A | 5/1900 | Wood | |
| 2,612,139 A | 7/1947 | Collins | |
| 2,798,458 A | 8/1956 | Oddermatt | |
| 3,027,617 A * | 4/1962 | Gray | 24/303 |
| 3,086,268 A | 4/1963 | Chaffin, Jr. | |
| 3,589,341 A | 6/1971 | Krebs | |
| 3,995,598 A | 12/1976 | Gardner et al. | |
| 4,321,891 A | 3/1982 | Moeller | |
| 4,426,957 A | 1/1984 | Horrigan | |
| 4,881,492 A | 11/1989 | Jones | |
| 4,895,110 A | 1/1990 | LoCascio | |
| 4,917,049 A | 4/1990 | Peterson | |
| 5,050,538 A | 9/1991 | Gurski, Jr. | |
| 5,450,820 A | 9/1995 | Kirsch | |
| 5,785,011 A | 7/1998 | Gitterman, III | |
| 5,791,297 A * | 8/1998 | Mudge | 119/865 |
| 6,247,427 B1 | 6/2001 | DeBien | |
| 6,857,169 B2 * | 2/2005 | Chung | 24/303 |
| 6,899,060 B1 * | 5/2005 | Yen | 119/863 |
| 6,955,138 B2 | 10/2005 | DeBien | |
| 7,246,384 B2 | 7/2007 | Bentz | |
| 7,389,750 B1 | 6/2008 | Rogers et al. | |
| 2011/0179604 A1 * | 7/2011 | Desser | 24/303 |
| 2012/0080917 A1 * | 4/2012 | Miller et al. | 297/250.1 |
| 2013/0269629 A1 * | 10/2013 | Holt, Jr. | 119/863 |

* cited by examiner

*Primary Examiner* — Lisa Tsang
(74) *Attorney, Agent, or Firm* — Dean A. Craine

(57) ABSTRACT

An animal collar includes a neck strap with magnetic elements on the neck strap's two opposite ends. The magnetic elements are configured to self align during installation and hold an encircling neck strap around an animal's neck. In one embodiment, the magnetic elements are one or more pairs of magnets attached to the opposite ends of the neck strap. The poles of each magnet pair are aligned so the magnets in each pair attract. The neck strap also includes two perpendicularly and transversely aligned closed eyelets mounted on the opposite ends. When the opposite ends are placed side-by-side, the magnetic elements are aligned and forced together and the two eyelets are side by side and parallel. A leash clip can then be attached to the two eyelets to hold them together when walking. When the leash clip is disconnected, the magnetic elements are configured to separate when a light force is exerted on the neck strap. An optional connector is provided that holds the two eyelets together when the leash clip is not used.

13 Claims, 4 Drawing Sheets

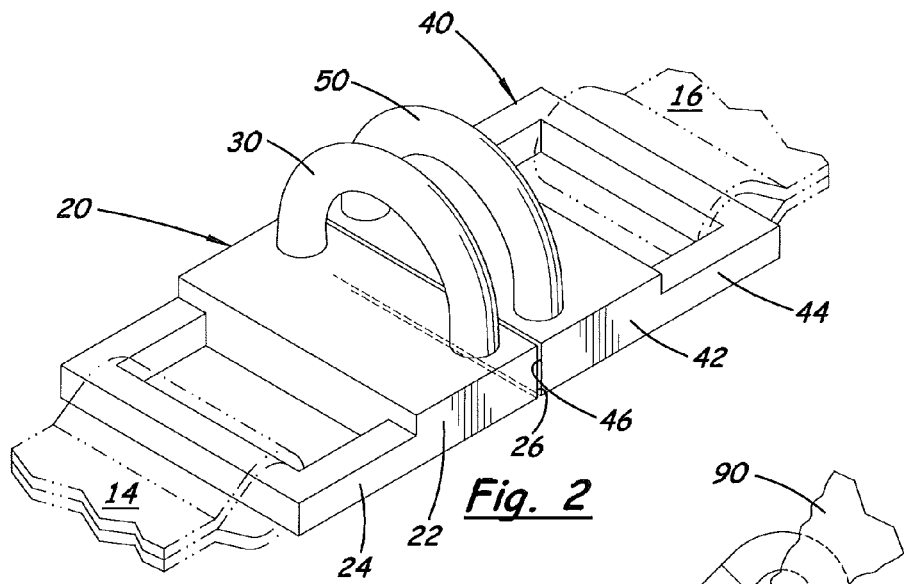
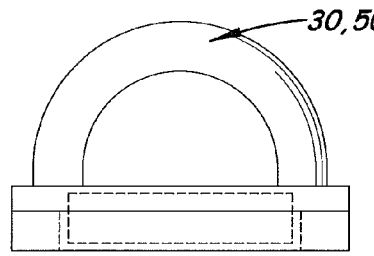
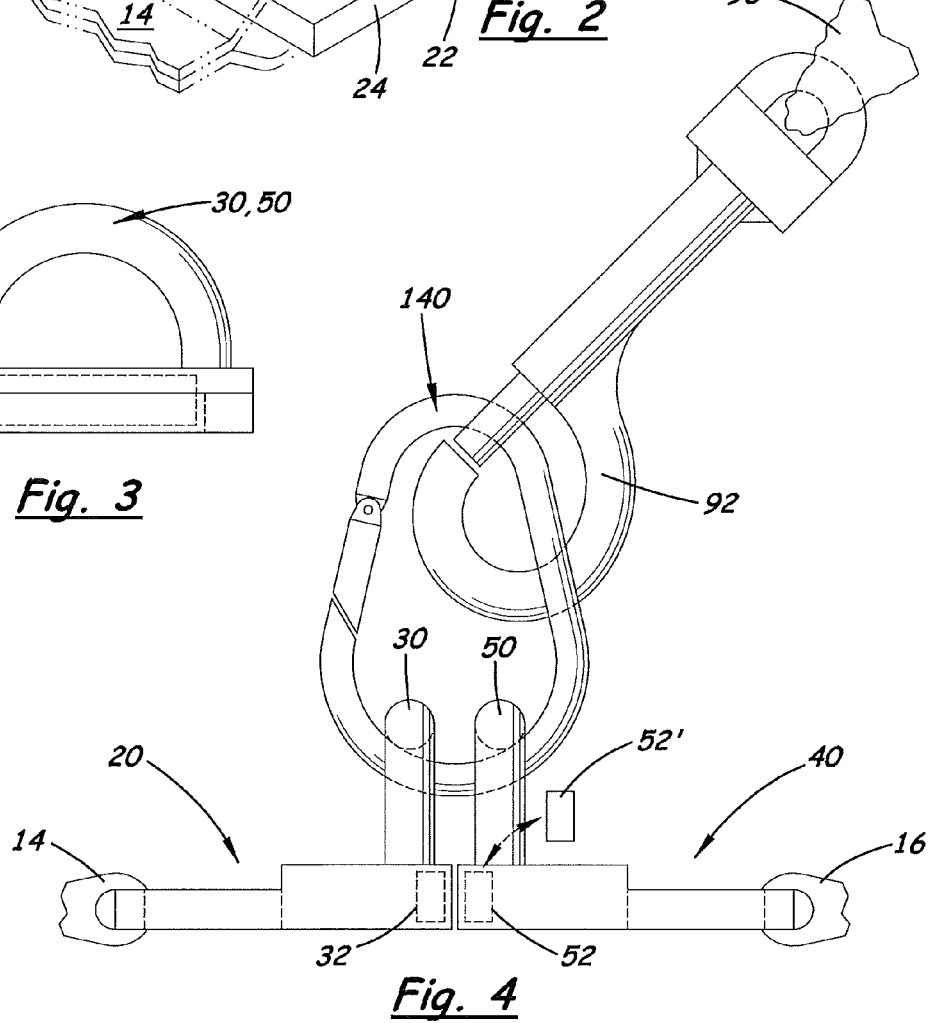

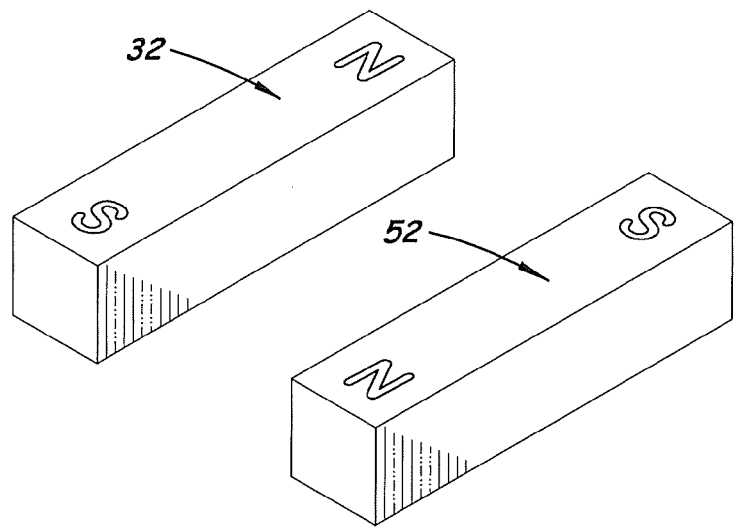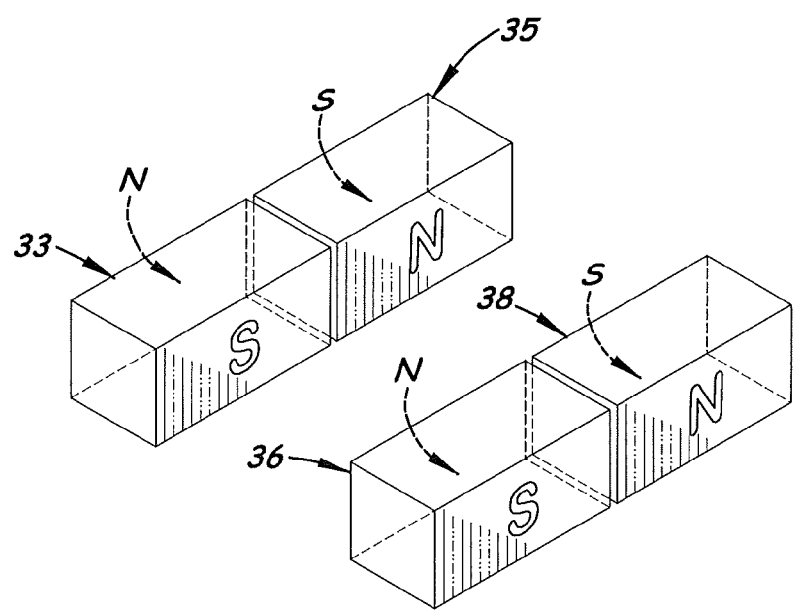
Fig. 5

ANIMAL COLLAR

Notice is given that the following patent document contains original material subject to copyright protection. The copyright owner has no objection to the facsimile or digital download reproduction of all or part of the patent document, but otherwise reserves all copyrights.

This utility patent application is based on and claims the priority date of U.S. provisional patent application (application Ser. No. 61/601,803) filed on Feb. 22, 2012.

BACKGROUND OF THE INVENTION

1. Field of the Invention

This invention relates to animal collars and more particularly, to animal collars with ends that self-align and attach around an animal's neck and can auto release when the collar is snagged.

2. Description of the Related Art

Many animals, such as horses and large dogs, have necks and other anatomical structures that make it difficult to align and connect the opposite ends of a collar together around the animal's neck. Usually, the owner or master must hold the opposite ends of the collar and force them with two hands.

Dog lovers and dogs enjoy walking with a leash that selectively attaches to the dog's collar. The dog leash typically includes a clip that attaches to a D-ring mounted on the collar. Attached to the ends of the collar are male and female end connectors that slide together to hold the collar in place around the dog's neck. A D-ring is permanently attached to the collar that selectively attaches to a clip attached to the end of the leash.

When restraining the dog, substantial force is exerted by the male and female connectors and on the D-ring. Because the D-ring is typically permanently attached to the collar, when the leash is disconnected from the D-ring, the D-ring is exposed and susceptible to being snagged by other objects when the dog is playing or chase other animals.

What is needed is an animal collar sufficiently strong and durable that is self-aligning around the neck of an animal when initially draped around the neck, that selectively attaches to a standard leash with clip or similar connector designed to attached to a D-ring, and allows the collar to easily disengage from the neck when detached to prevent injuries or strangulation when caught or snagged by an object.

SUMMARY OF THE INVENTION

A safety animal neck collar designed to be connected to a leash to restrain the animal's movement, and that automatically releases and detaches from the neck when used without a leash and light force is exerted thereon.

The collar includes neck strap designed to wrap around the neck of an animal. Attached to the straps opposite ends are two magnetic elements. In one embodiment, the magnetic elements are bar magnets located inside end connectors attached or mounted to the opposite ends of the neck strap. In one embodiment presented herein, each connector end includes a rectangular, flat body with a flat exposed transversely aligned outer edge.

Mounted on the opposite ends of the neck strap are perpendicularly aligned closed eyelets. When the neck strap includes end connectors, the eyelets extend perpendicularly and upward from the flat body. The eyelet is located adjacent to the flat body's outer edge positioning in parallel alignment when the two opposite ends are placed end to end. In each embodiment, the eyelets are positioned at or adjacent to the ends of neck strap so a leash clip on the end of a leash can be selectively attached to the two eyelets to hold the two ends together and hold the neck strap around the animal's neck. It should be understood, that the magnetic elements may be one or two pairs of magnets mounted on the opposite ends of the neck strap or the magnetic elements may be one magnet and one steel plate magnetically attracted together.

In either embodiment, a magnetic force is generated between magnetic elements on opposite ends of the neck strap so that opposite ends self align when brought together within one inch of each other. The magnetic elements are also sufficient size and produce a magnetic force that allows the opposite ends of the neck strap to disconnect when the neck strap is snagged when the dog is pulling against the collar. In the embodiments presented, various sizes of magnetic elements are used for different size dogs. For collars used by smaller doge, small magnetic elements will be used that release when approximately 2 lbs of separation force is exerted. For collars used by larger dogs, larger magnetic elements will used that release approximately 30 lbs of separating force is exerted When an owner does not want the collar to disconnect, an optional eyelet locking element may hold the two eyelets together when the clip on a strap is disconnected.

DESCRIPTION OF THE DRAWINGS

FIG. 2 is a perspective view of the two magnetic connectors connected to the opposite ends of a neck strap and connected together.

FIG. 3 is a side elevational view of a magnetic connector.

FIG. 4 is a front elevational view of the two magnetic connectors shown in FIG. 1.

FIG. 5 is an illustration showing two sets of bar magnet pairs that can be mounted on the end caps.

DESCRIPTION OF THE PREFERRED EMBODIMENT(S)

Figure 1:
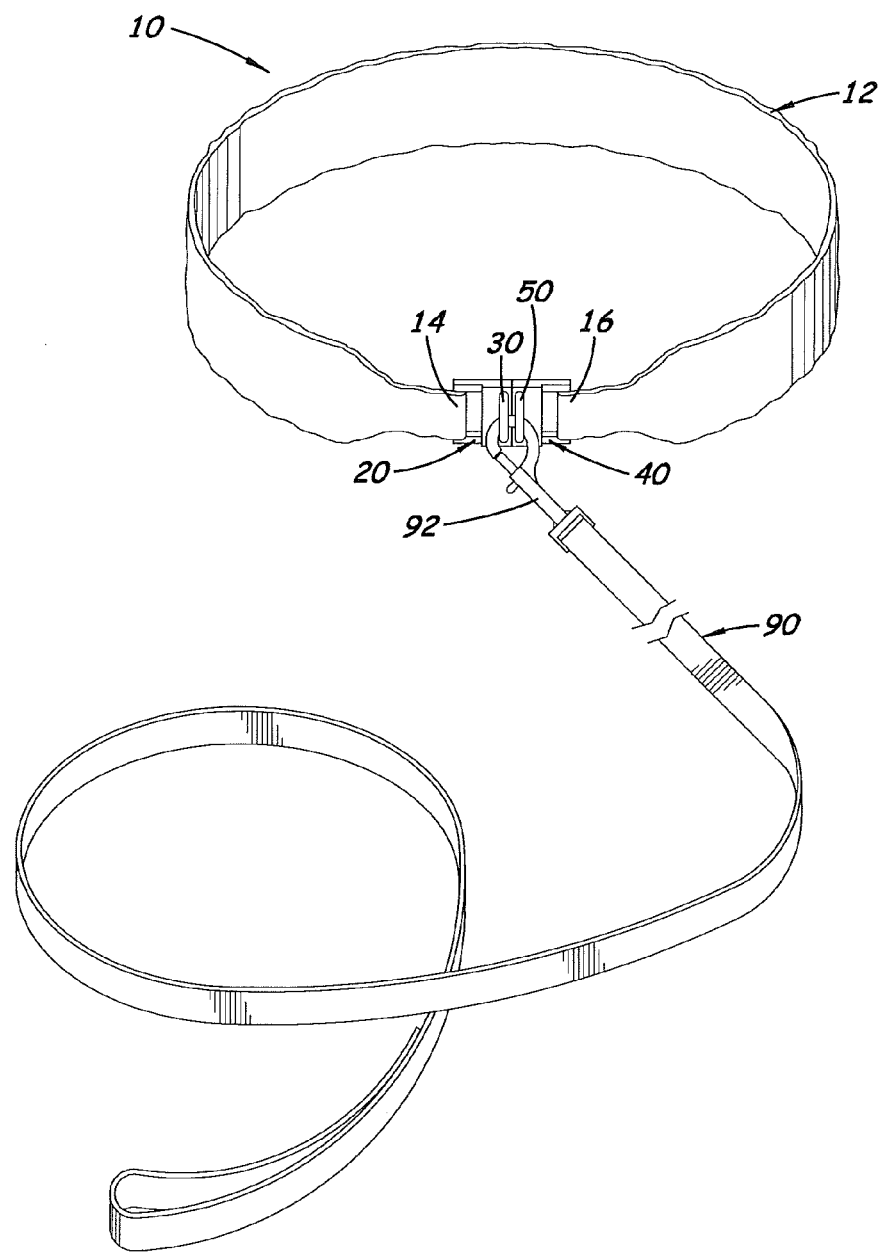
FIG. 1 is a perspective view of the safety collar disclosed and attached to a leash.

Referring to the accompanying FIGS. 1-4, there is shown an animal neck collar 10 designed to be connected to a leash 90 to restrain the animal's movement, self aligns when initially placed around the neck, and automatically releases from the neck when used without a leash and light to moderate force is exerted thereon.

The collar 10 includes neck strap 12 with two opposite ends 14, 16 with a fixed or adjustable length configured to extend around the neck of an animal and with the two opposing ends 14, 16 placed adjacent to each other. The neck strap 12 may also include a length adjustment buckle or some other length adjustable element (hook and loop strips) that allow the length of the neck strap 12 to be selectively adjusted.

Attached or mounted on the opposite ends 14, 16 is one or multiple pairs of magnetic elements configured to hold the opposite ends of the neck strap 12 together when brought in close proximity. As shown in FIG. 2, in one embodiment, the two end caps 20, 40 are attached or mounted to the neck strap's opposite ends 14, 16. Each end cap 20, 40 includes a flat body 22, 42, respectively, with a strap connecting means on one end and a flat transverse outside end 26, 46. In the embodiment shown in FIG. 2, the strap connecting means are represented as closed rings 24, 44 designed to engage loops or another structure formed or attached to the strap's opposite ends 14, 16, respectively. It should be understood, that the closed rings 24, 44 may be replaced by other structures that connect to the opposite ends 14, 16 of the neck strap 12.

Extending upward and perpendicular from each the flat body 22, 42 is a transversely aligned, closed eyelet 30, 50, respectively. The eyelet 30, 50 is located adjacent to the outside transverse outer surface edge 26, 46, respectively, enabling the two eyelets 30, 50 to be aligned parallel and adjacent then the two connectors 20, 40 are aligned end to end as shown in FIGS. 1, 2 and 4.

As shown in FIGS. 3 and 4, located inside the end caps 20, 40 or mounted on the end surfaces 26, 46, respectively are one or more pairs of magnetic elements. In one embodiment, one pair of magnetic elements are used that includes a first magnetic bar 32 and a second magnetic bar 52 transversely aligned on the end caps 20, 40, respectively. The end cap 20 or 40 may be made of non-magnetic material and the first magnetic bar 32 and the second magnetic bar 52 may be placed inside therein. Alternatively, the first magnetic bar 32 and second magnetic bar 52 may be adhesively attached to the end surfaces 26, 46. In either embodiment, the first and second magnetic bars 32, 52 are configured to generate an attractive magnetic force between them so they are drawn together when positioned approximately 1 inch apart. The two magnetic bars 32, 52 will continue to hold the two opposite ends of the neck strap 12 together during normal use. When an excessive pulling force is exerted on the neck strap 12, the magnetic force is overcome enabling the opposite ends to disconnect and allowing the collar 10 to detach from the neck.

The key feature of the invention is the use of two outward extending eyelets 30, 50 mounted on the opposite ends 14, 16 of the neck strap 12 that are self aligned and temporarily held together by a weak or strong magnetic force depending on the size of the animal. To walk an animal wearing the collar 10, the leash clip 92 attached to the end of a leash 90 is connected to the two eyelets 30, 50 as shown in FIG. 1. The clip 92 holds the two eyelets 30, 50 together. The magnet bars 32, 52 keep the opposite ends of the neck strap 12 properly aligned.

FIG. 5 is an illustration showing the orientation of one pair of magnet bars 32, 52 two when mounted on the end caps (not shown). The magnet bars 32, 52 are configured and aligned so that their magnetic poles oriented on opposite lateral directions and facing the opposite magnet. Also shown in FIG. 5 is a second set of magnetic elements comprising two sets of magnet pairs 33, 35, 36, and 38. The pairs of small magnets 33, 35 are aligned so the polarities of the small magnets 36, 38 directly across are opposite end.

Figure 6:
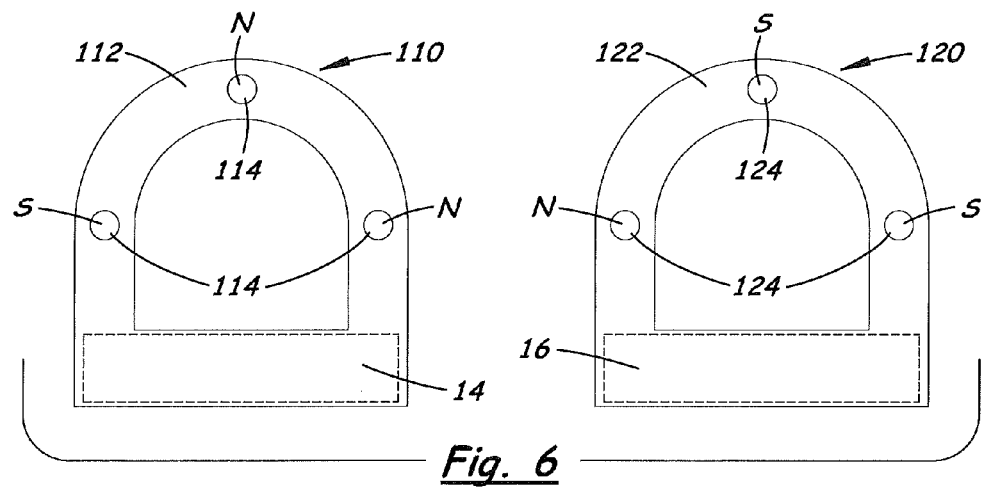
FIG. 6 is an illustration showing the elevational views of the two end caps with a plurality of round magnets mounted on the outside surface of eyelet with their polarities oriented in opposite directions.
Figure 7:
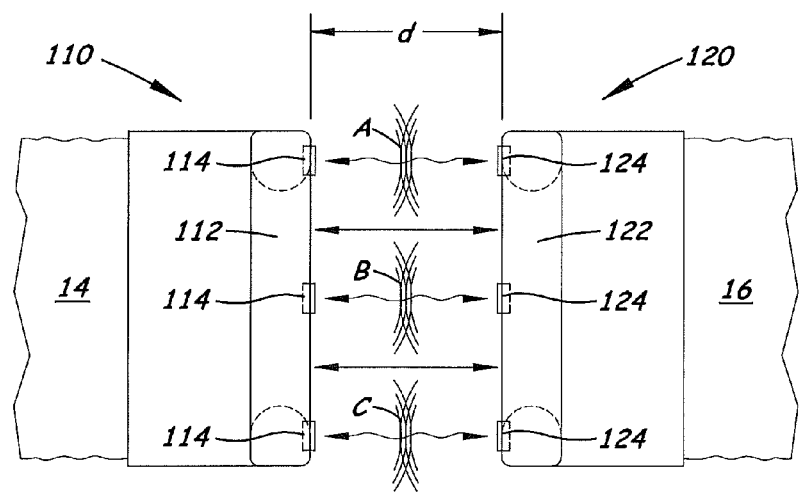
FIG. 7 is a top plan view of a neck collar that uses the two end caps shown in FIG. 6 showing the end caps being brought in close proximity so that the magnetic fields disposed between the adjacent magnets pull the two end caps together.

FIG. 6 is an illustration showing the elevational views of the two end caps 110, 120 with a plurality of round magnets 114, 124 mounted on the outside surface of the two eyelets 112, 122 with their polarities oriented in opposite directions. FIG. 7 is a top plan view of the collar 10 and the two end caps 110, 120 shown in FIG. 6 brought in close proximity so the magnetic fields 'A', 'B' and 'C' disposed between the adjacent cap magnets 114, 124 pull the two end caps 110, 120 together.

The magnet bars 32, 52 or 33, 34, 36, 38, or cap magnets 114, or 124 used in the embodiments shown herein are configured to pull the neck strap's opposite ends together when they are within a selected distance 'd' of each other. For a dog or cat, the distance 'd' is approximately 1 inch. The magnet bars 32, 52, 33, 34, 36, 38 and cap magnets 114, 124 are also configured and properly sized so they release with approximately 2 lbs to 30 lbs of axial force is exerted between the two opposite ends.

As stated above, in some instances an owner may not want the collar 10 to automatically disconnect. Therefore, as shown in FIG. 4, an optional eyelet locking element 140 may be used to interconnect the two eyelets 30, 50 together. The eyelet locking element 140 may also be used as an intermediate structure that connects to the leash clip 92

In compliance with the statute, the invention described has been described in language more or less specific as to structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

I claim:
1. A self-aligning animal neck collar, comprising,
   a. a neck strap with two opposite ends configured to extend around a neck of an animal when the opposite ends are adjoined;
   b. an end cap attached on each opposite end of the neck strap, each end cap includes a flat body with a transverse outside edge and a closed eyelet with an outside surface, said closed eyelet being perpendicularly aligned with the flat body and parallel with the outside edge of the flat body, the two eyelets being aligned on the two flat bodies so that when said neck strap is extended around the neck of the animal and the opposite ends are aligned in an end-to-end manner adjacent to each other, the outside surfaces of the two eyelets are parallel and aligned in side-by-side positions; and,
   c. at least one magnetic element attached to the transverse outside edge of each flat body or to the outside surface of each eyelet, the magnetic elements being oriented with respect to each other and configured to create sufficient magnetic force that automatically aligns and holds the opposite outside edges of the flat bodies and the outside surfaces on the eyelets together when the eyelets are aligned in side-by-side positions.

2. The neck collar as recited in claim 1, wherein the magnetic elements are two transversely aligned bar magnets attached or mounted on the two outside edges of the flat bodies, the two bar magnets being oriented parallel to the transverse outside edges on the flat bodies with their magnetic poles facing opposite directions so they are magnetically attracted.

3. The neck collar as recited in claim 2, wherein each bar magnet is mounted inside the protective end cap.

4. The neck collar as recited in claim 2, wherein the magnetic elements are two pairs of bar magnets
   attached or mounted on the two outside edges of the flat bodies, the two pairs of bar magnets being aligned so the polarities of the two bar magnets in each pair of bar magnets are aligned in the same direction in one flat body and aligned in an opposite direction from the two bar magnets on an opposite flat body.

5. The neck collar as recited in claim 1, wherein the magnetic elements are a plurality of cap magnets attached to the outside surface of each eyelet, the cap magnets being aligned in side by side positions with the cap magnets located on opposite eyelets, the cap magnets attached to each eyelet so that their polarities are aligned in the same direction, the cap magnets on an opposite eyelet being oriented in an opposite direction so that the polarities of the cap magnets on the two eyelets are oriented in opposite directions.

6. The neck collar as recited in claim 1, wherein the magnetic elements include a single magnetic bar located on the outside edge of one flat body and a second bar made of steel located on the outside edge of the other flat body and that is magnetically attracted to the single magnet bar.

7. The neck collar as recited in claim 6, wherein the single magnetic bar is mounted inside the end cap.

8. The neck collar as recited in claim 1, wherein the magnetic elements generate 2 to 30 pounds of magnetic force.

9. The neck collar as recited in claim 1, further including an eyelet locking apparatus that holds the two eyelets together when the two flat bodies on the end caps are aligned in a side-by-side manner.

10. An animal neck collar, comprising,
   a. a neck strap configured to extend around a neck of an animal, the neck strap includes two opposite ends aligned in an end to end manner when the neck strap is extended around the neck of the animal;
   b. an end cap attached on each opposite end of the neck strap, each end cap includes a flat body with a transverse outside edge and a closed eyelet with an outside surface, each closed eyelet being perpendicularly aligned with the flat body and parallel with the transverse outside edge of the flat body, the two eyelets aligned on the two flat bodies so that when the neck strap is extended around the neck of the animal and the outside edges of the opposite flat bodies are aligned in an end-to-end manner adjacent to each other, the outside surfaces of the two eyelets are parallel and aligned in side-by-side positions, enabling an eyelet locking assembly or a leash clip to extend through the two eyelets and hold the two eyelets together; and,
   c. at least one magnet located on each end cap, the magnets configured to generate a magnetic attractive force when the opposite outside edges on said flat bodies are brought within 1 inch of each other and require 2 to 30 pounds of force to separate the flat bodies.

11. The neck collar as recited in claim 10, wherein each magnet is a bar magnet mounted inside the protective end cap attached or mounted on the transverse outside edge of the flat body.

12. The neck collar as recited in claim 10, wherein two pairs of bar magnets are mounted on the two outside edges of the two flat bodies,
   the pair of bar magnets on one flat body being aligned and oriented with the pair of bar magnets on the opposite flat body so that when the outside edges of the two flat bodies are positioned in a side-by-side position, the polarities of the bar magnets on the opposite flat bodies are oriented in opposite directions.

13. The neck collar as recited in claim 10, further including a plurality of cap magnets attached to the outside surface of each said eyelet.

* * * * *